April 23, 1963  A. R. BECKINGTON  3,086,731
AIRCRAFT CONTROL SYSTEM
Filed Oct. 4, 1960  2 Sheets-Sheet 1
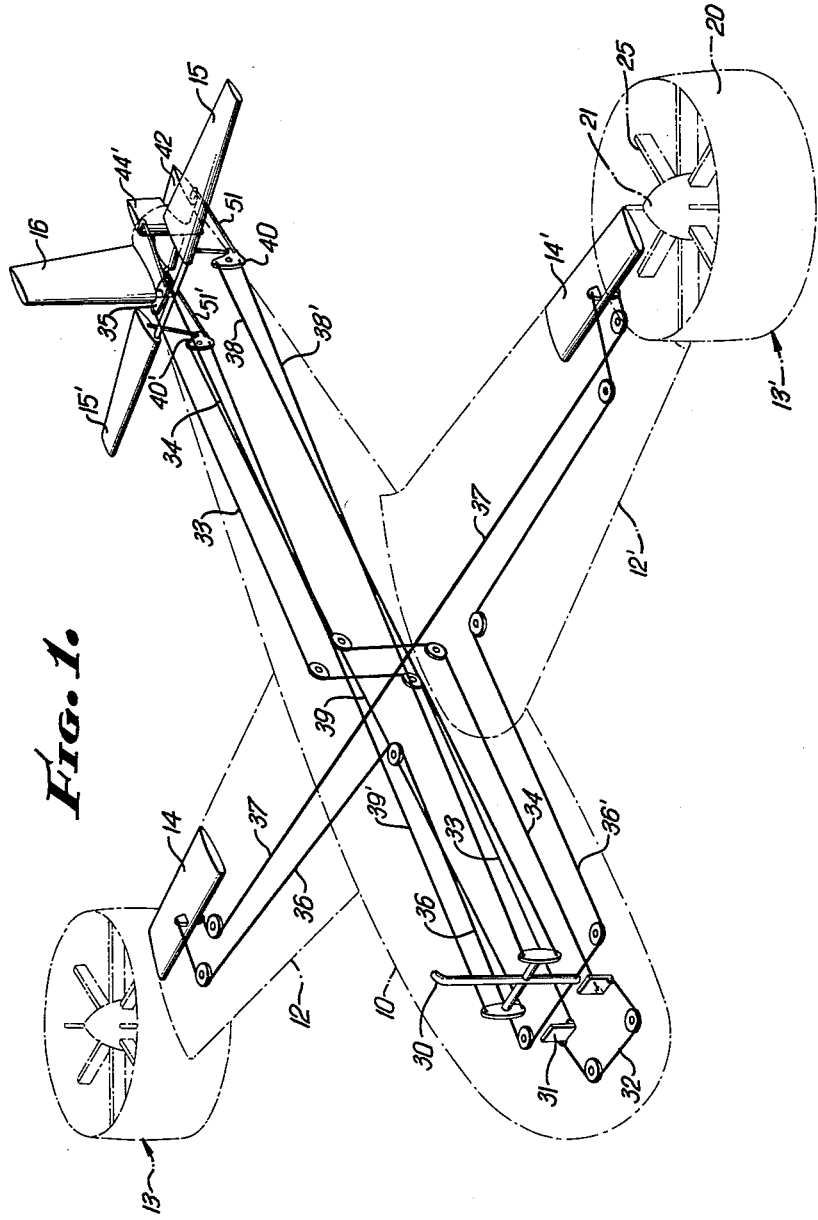
ARTHUR R. BECKINGTON
INVENTOR.
BY Miketta & Glenny
ATTORNEYS.

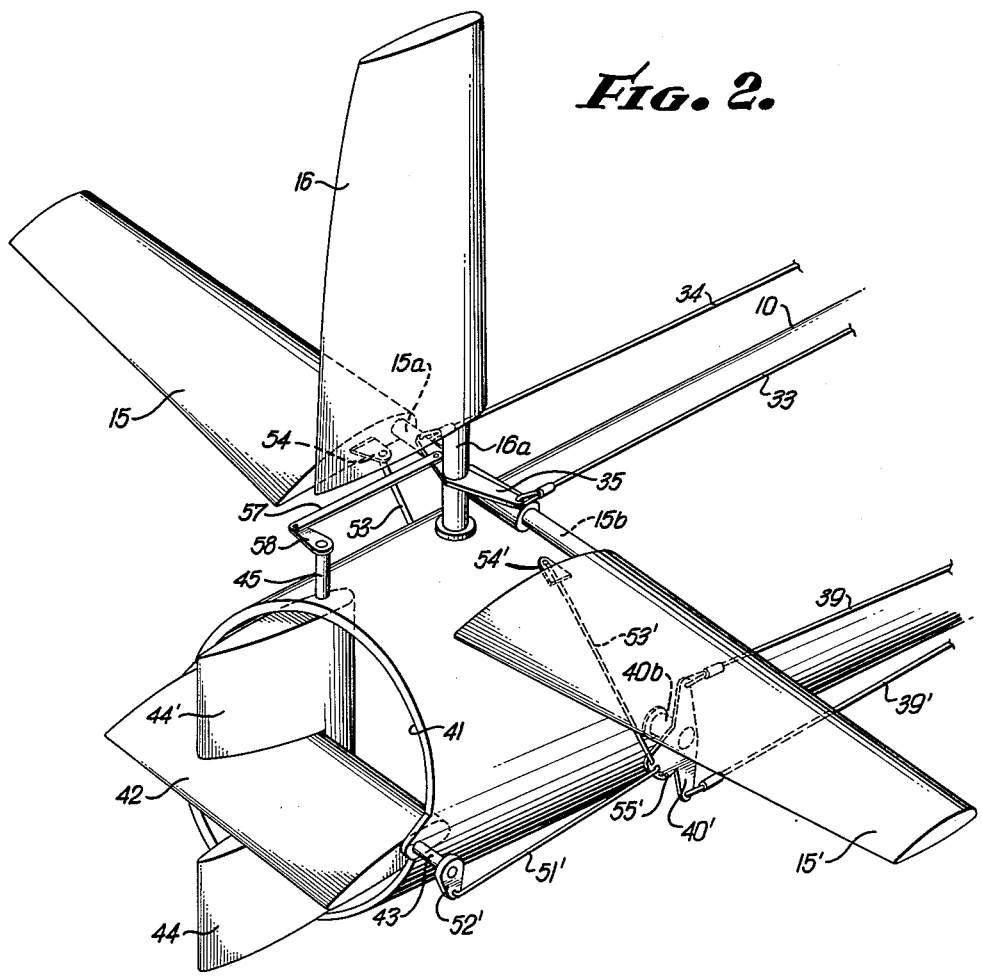

United States Patent Office 3,086,731
Patented Apr. 23, 1963

3,086,731
AIRCRAFT CONTROL SYSTEM
Arthur R. Beckington, San Pedro, Calif., assignor, by mesne assignments, to Edmond R. Doak, Los Angeles, Calif.
Filed Oct. 4, 1960, Ser. No. 60,471
9 Claims. (Cl. 244—52)

This invention relates to a control system for aircraft and although it is applicable to a variety of aircraft, it is of particular utility when applied to an aircraft capable of hovering, rising and landing vertically, and flying horizontally. Such an aircraft is referred to as a vertical take-off aircraft and an exemplary device is disclosed in application Serial No. 780,164 filed December 12, 1958, now Patent No. 2,961,189 by Edmond R. Doak for a "Vertical Take-off Aircraft Construction" and application Serial No. 828,111, filed July 20, 1959, by Norman E. Nelson et al. for an "Aircraft Control System" of which the present invention is an improvement.

A vertical take-off aircraft capable of hovering, rising vertically, and flying horizontally at high speeds has many advantages over other type aircraft as disclosed in detail in application Serial No. 780,164. Such an aircraft may be provided with thrust-producing propulsion units rotatably carried by the lateral extremities of the wings and means for partially rotating each propulsion unit about an axis perpendicular to the longitudinal axis or about an axis parallel to the lateral axis of the aircraft. This allows the direction and angle of the thrust generated by such propulsion units to be controllably varied through a range of 90° or more. Such an arrangement permits the aircraft to hover, to rise and to land in a virtually vertical plane when the ducts are in a vertical position, and to fly horizontally at relatively high speeds after becoming airborne when the ducts are rotated into the horizontal position.

The present invention and copending application Serial No. 594,537, filed June 28, 1956, now Patent No. 2,991,026 by Norman E. Nelson on an "Aircraft Control System" are particularly directed to a control system for an aircraft of the type disclosed hereinbefore, where the control system is adapted to supplement and operate in conjunction with the basic or conventional control system employing the normal exterior control surfaces of an aircraft, such as rudder, elevators, and ailerons. When a vertical take-off aircraft as described above is rising, landing or substantially hovering in a vertical plane, these normal exterior control surfaces are ineffective to control the roll of the aircraft about its longitudinal axis, the pitch of the aircraft about its lateral axis, and the yaw of the aircraft about its vertical axis. The control system in copending application Serial No. 594,537 discloses means for controlling the rolling or banking of the aircraft when it has substantially no forward speed and is moving or hovering in a substantially vertical palne.

The present invention is particularly directed to a control system for an aircraft as described hereinbefore to control the yaw and pitch of the aircraft about its vertical and lateral axis respectively, when the aircraft has substantially no forward speed and is moving or hovering in a vertical plane. The control system is connected to and operates in conjunction with the normal rudder and elevators of the aircraft so that during horizontal flight, the present invention also aids in controlling yaw and pitch of the aircraft. The vertical take-off aircraft as described above will therefore be provided with means for controlling its roll, pitch and yaw with a combined control system of the present invention and that disclosed in application Serial No. 594,537.

The present invention is an improvement of the control system disclosed in application Serial No. 828,111, both of which may be provided on an aircraft having a rearwardly directed engine exhaust tail pipe (generally disposed in substantially axial alignment with the fuselage), such rearwardly directed thrust facilitating and aiding in forward progress of the aircraft. Both systems provide at least two pivotally mounted vanes in the trailing edge portion of and in the path of the gases from the tail pipe. The movement of these vanes is adapted to be correlated with the movement of the normal control surfaces such as the elevators and rudder. All of these controls are associated with pilot-controlled means for controllably moving the normal control surfaces, thereby facilitating the ease of maneuverability of the aircraft in either horizontal or vertical flight. The present control system has all of the advantages of the system disclosed in application Serial No. 828,111, and, in addition, includes means for advantageously positioning the pivotally mounted vanes and exterior control surfaces at different angular positions with respect to each other during the transition period of the aircraft between rising or landing vertically and flying horizontally.

It has been found that when the thrust-propulsion units are being rotated between vertical and horizontal positions during the transition period between vertical and horizontal flight, the aircraft is controlled more effectively by moving the interior control vanes (in the path of the engine exhaust gases) through a different angular displacement than the exterior control surfaces (elevators and rudder). During this transition period, the velocity of the engine exhaust gases over the interior control vanes is substanially greater than the velocity of the air moving over the exterior control surfaces. By varying the angular settings of the interior and exterior control surfaces with respect to each other and with respect to the different velocity fluids flowing over each of these surfaces, greater and more effective control of the aircraft is possible, particularly during the transition period.

Therefore, the present invention is directed to an improved flight control system for controlling pitch and yaw of an aircraft during a transition period between vertical and horizontal flight. The present system is adapted to position the interior and exterior control surfaces into most effective angular settings to achieve the maximum controllability of the aircraft when the velocity of the fluids passing over each of these surfaces varies. All of these control surfaces are operated by the normal pilot-controlled means to facilitate the ease of maneuverability of the aircraft during horizontal, vertical or transitional flight.

An object of the present invention is to provide an improved aircraft flight control system for controlling pitch and yaw of an aircraft during a transitional period between vertical and horizontal flight.

Another object is to provide an aircraft flight control system for obtaining maximum controllability for the aircraft when the fluid over the exterior surfaces of the aircraft varies in velocity from the engine exhaust gases emitted from the exhaust tail pipe.

A further object is to provide an improved flight control system for a vertical take-off aircraft capable of rising and landing in a vertical plane, hovering, or having both forward and vertical movement, as during a transitional period.

Other objects and many of the attendant advantages of this invention will be readily appreciated as the same becomes better understood by reference to the following detailed description when considered in connection with the accompanying drawings, wherein:

FIG. 1 is a schematic perspective representation of an aircraft provided with an exemplary flight-control system embraced by this invention; and FIG. 2 is a rear perspective view of a tail assembly embodying a control system disclosed herein.

The application of Edmond R. Doak, Serial No. 780,164 discloses an airplane having a body and laterally disposed wings, a thrust-producing propulsion unit being carried by the lateral extremity of each of the wings. Each propulsion unit includes a thrust-generating means positioned within an open-ended duct, such thrust-generating means being generally a multi-bladed rotor mounted for axial rotation within the duct or shroud. A single, primary power plant or engine carried by the body of the airplane may be used in driving the multi-bladed elements within their respective shrouds or ducts; the exhaust from such power plant is preferably discharged rearwardly along an axis substantially coincidental with the axis of the aircraft. As disclosed in the said application, each of the thrust-generating means carried by the lateral extremity of each of the wings includes means for controllably and partially rotating the propulsion units about an axis transverse to the body of the aircraft, whereby the thrust generated by such units may be directed downwardly (as during takeoff or hovering) and rearwardly for rapid forward flight or at any desired angle between these two virtually extreme positions.

It will be readily appreciated that pitch and yaw control during hovering or minimal horizontal movement through the air cannot depend upon the dynamic action of the passage of air over normal control surfaces, such as the rudder and elevators. In accordance with the present invention, yaw and pitch of the airplane is controlled under the aforesaid conditions by varying the direction of the thrust from the power plant tail pipe, preferably located along the longitudinal axis of the airplane. The controls herein contemplated are interrelated with the normal control surfaces (rudder and elevators) so that they can be readily and easily mastered by a pilot.

FIG. 1 is a schematic representation of an airplane provided with exemplary flight control devices embraced by this invention. The body or fuselage of the airplane is generally indicated by dash lines at 10. The wings are also indicated by dash lines at 12 and 12'. Thrust-producing units 13 and 13' are shown carried by the lateral extremities of the wings 12 and 12'. Normal control surfaces such as ailerons 14 and 14', elevators 15 and 15' and a rudder 16 are also shown, these normal control surfaces being shown in full lines.

Each of the thrust-generating propulsion units, such as 13, preferably comprises a substantially cylindrical shroud 20 (the wall of such shroud being preferably of airfoil section). The shroud therefore forms an open-ended duct provided with an open inlet end and an open outlet end. Axially positioned within each shroud 20 is a streamlined hub 21 enclosing suitable transmission means whereby a bladed impeller (not shown) is driven within the shroud, the impeller rotating about an axis coincidental with the axis of the shroud. The entire propulsion unit 13 is mounted for partial rotation about an axis transverse to the body or fuselage 10 of the airplane, one means of so mounting and variably positioning the propulsion unit being described in the copending Doak application aforementioned. A plurality of radial guide vanes 25 may be positioned adjacent the inlet side of the bladed element, the inner ends of such guide vane being pivotally mounted in the hub 21. Such vanes 25 are normally held so as to lie in planes passing through the axis of the shroud 20 or at least in planes parallel to such axis.

The airplane is preferably provided with the usual controls for the normal control surfaces, such means being pilot-controlled as through the medium of a control stick 30 and rudder pedals 31. In order to simplify the description, a common type of cable control is illustrated, the rudder pedals 31 being interconnected as by cable 32 and cables 33 and 34 to a rudder horn 35 adapted to variably position the rudder 16.

The control stick 30 is also shown provided with aileron cables 36 and 36' leading to ailerons 14 and 14', respectively, the two ailerons being interconnected by cable 37, whereby equal and opposite movements may be imparted to the two ailerons.

The control stick 30 is also connected as by means of cables 38 and 38', 39 and 39' to elevator horns or bellcranks 40 and 40', respectively, whereby the attitude of the elevators 15 and 15' may be controlled. The bellcranks 40 and 40' may be pivoted on the tail pipe 41 by means of butt shafts 40a and 40b, respectively. Details of construction are not illustrated inasmuch as pilot-controlled means for adjustably positioning normal surfaces, such as ailerons, elevators and rudders, are well known in the art.

The present invention contemplates an interlock between the normal pilot-operated control surfaces used for controlling yaw and pitch and means utilizing the axial thrust of a tail pipe. The tail pipe 41 may discharge gases from the primary power plant or engine used for driving the impellers in the units 13 and 13'. A rearwardly directed exhaust tail pipe 41 is shown in FIG. 2 below the rudder 16 and below the elevators 15 and 15'.

The tail pipe 41 is provided with at least two pivotally mounted vanes in the trailing edge portion and in the path of gases being rearwardly discharged by such tail pipe 41. In the drawings, one of said vanes 42 is mounted for pivotal movement about a horizontal axis indicated by the shaft 43. Another vane, shown as furcated and including portions 44 and 44', is pivotally mounted for movement about a vertical axis indicated by shaft 45. As shown in FIG. 2, one of the vanes 42 continuously extends across the exhaust pipe 41, while furcated vane portions 44 and 44' continuously extend from the sides of vane 42 to the inner surface of the tail pipe 41. This provides substantially continuous vertical and horizontal control surfaces for inherently obtaining greater control of yaw and pitch of the aircraft than if the surfaces were broken or interrupted.

As stated above, since there is a difference in velocity of the air flowing over the exterior control surfaces (elevators 15, 15' and rudder 16) and the exhaust gases passing over the interior control surfaces (vanes 42, 44, 44') particularly during the transition period described above, means are provided for moving the interior control vanes through a different angular displacement than the exterior control vanes. This provides different angular settings for the interior and exterior vanes and allows maximum control efficiency for the aircraft with respect to the higher velocity exhaust gases in tail pipe 41 and the lower velocity exterior air.

As shown, the shafts 15a and 15b for pivotally mounting the elevators 15 and 15', respectively, are in alignment with each other and are offset from the shaft 43 for pivotally mounting the horizontal vane 42; and the shaft 16a for pivotally mounting the rudder 16 is offset from the shaft 45 for pivotally mounting the vertical vanes (44 and 44').

Means for moving the horizontally pivoted vane 42 through a different angular displacement than the elevators 15 and 15' may include control rods 51 and 51' pivotally connected at one of their ends to links 52 and 52', respectively, which are fixed to and adapted to pivot with shaft 43; the other ends of rods 51 and 51' are pivotally connected to the bellcranks 40 and 40', respectively. Control rods 53 and 53' may be provided and may be pivotally connected at one of their ends to bellcranks 40 and 40', respectively, and at their other ends to flanges 54 and 54' fixed to and adapted to pivot with elevators 15 and 15', respectively, about the axes of the shafts 15a and 15b. Therefore, by moving the bellcranks 40 and 40', the horizontal vane 42 and elevators 15 and 15' may be concurrently moved. By having the control rods 51, 51' and 53, 53' vary in length the vane 42 and elevators 15 and 15' will move through different angular displacements.

The control rods 51 and 53 may be adjustably positioned on the bellcranks 40 and 40' by being connected at different openings 55 and 55' provided in the bellcranks 40 and 40', respectively. Therefore, means are provided for varying the initial angular setting of the interior vanes with respect to the exterior vanes.

Means may be also provided for moving the vertically pivoted vane 44, 44' through a different angular displacement than the rudder 16 and may include a control rod 57 pivotally connected at one end to a link 58 which is fixed to the vertical shaft 45 and pivotally connected at its other end to the horn or bellcrank 35. By proper design of the link 58 and the length of rod 57, the rudder 16 and vane 44—44' may move through different angular displacements in response to movement of the horn 35. However, since here the directional control of the aircraft is involved, it can easily be understood that it may be desirable to have the rudder and vane 44—44' move through the same angular displacement, even during the transition period.

It can be seen that in response to the pilot control means or stick 30, the rudder 16 as well as vanes 44—44' are moved, thereby utilizing and translating the normally axial thrust of the gases discharged from the tail pipe 41 into angularly directed thrust for facilitating yaw or directional control of the aircraft about a vertical axis. Similarly, pitch about a lateral axis is controlled not only by the elevators 15 and 15', but also by the utilization of the normally axial thrust of the gases discharged from the tail pipe 41, such gases now directed angularly by impingement upon the adjustable vane 42.

However, with the present invention, it is possible to vary the angular displacement of the interior control vanes with respect to the exterior control vanes. By proper design and lengths for the control rods 51, 53 and 57, the interior vanes may be positioned at different angular positions than the exterior vanes. As described above, this would be advantageous during the transition period of a vertical take-off aircraft when there is both forward and vertical flight. Moreover, by proper design, the initial settings of the interior vanes may be varied, such as having the chord of the elevators 15 and 15' at a slight angle to the horizontal when the chord of the vane 42 is at a zero angle with respect to the horizontal. Other variations are contemplated and it is easily understood that many combinations and designs are possible with the present invention to satisfy requirements of different type aircraft.

Therefore, many modifications and variations of the present invention are possible in the light of the above teachings. It is therefore to be understood that within the scope of the appended claims the invention may be practiced otherwise than as specifically described.

I claim:

1. In an aircraft including elevator and rudder, pilot-controlled means for controllably moving said elevator and rudder, and a rearwardly directed engine exhaust tail pipe, the provision of a flight control system, comprising: at least two pivotally mounted vanes in the trailing edge portion of and in the path of gases from a rearwardly directed engine exhaust tail pipe, one of said vanes being pivotally mounted for movement about a horizontal axis and another being pivotally mounted for movement about a vertical axis, and means responsive to pilot control means for moving said horizontally pivoted vane and said elevator at different rates of angular displacement throughout the range of movement of said elevator and for moving said vertically pivoted vane and said rudder at different rates of angular displacement throughout the range of movement of said rudder.

2. In an aircraft as stated in claim 1, the provision of: means for varying the initial angular setting of said vanes with respect to said elevator and rudder.

3. In an aircraft as stated ni claim 1, wherein the axes of said horizontal vane and elevator are offset from each other, and the axes of said vertical vane and rudder are offset from each other.

4. In a vertical take-off aircraft capable of hovering, rising vertically and flying horizontally including elevator and rudder, pilot-controlled means for controllably moving said elevator and rudder, and a rearwardly directed engine exhaust tail pipe, the provision of a flight control system, comprising; at least two pivotally mounted vanes in the trailing edge portion of and in the path gases from a rearwardly directed engine exhaust tail pipe, one of said vanes being pivotally mounted for movement about a horizontal axis for controlling the pitching of the aircraft about its lateral axis, and the other of said vanes being pivotally mounted for movement about a vertical axis for controlling the yawing of the aircraft about its vertical axis when the aircraft has substantially no forward movement and is hovering or rising in a substantially vertical direction, and means responsive to pilot control means for moving said horizontally pivoted vane and said elevator at different rates of angular displacement throughout range of movement of said elevator and for moving said vertically pivoted vane and said rudder at different rates of angular displacement throughout the range of movement of said rudder, whereby said vanes, elevator and rudder are adapted to be positioned in the most effective angular positions for control purposes during the transition period of said aircraft between vertical and horizontal flight.

5. In an aircraft as stated in claim 4, the provision of means for varying the initial angular setting of said vanes with respect to said elevator and rudder.

6. In an aircraft as stated in claim 4, wherein the axes of said horizontal vane and elevator are offset from each other, and the axes of said vertical vane and rudder are offset from each other.

7. In a vertical take-off aircraft capable of hovering, rising vertically and flying horizontally including elevator and a rearwardly directed engine exhaust tail pipe, the provision of a flight control system, comprising: a vane pivotally mounted for movement about a horizontal axis in the trailing edge of and in the path of gases from a rearwardly directed engine exhaust tail pipe, and means for moving said horizontally pivoted vane and said elevator at different rates of angular displacement throughout the range of movement of said elevator, whereby said vane and elevator are adapted to be positioned in the most effective angular positions for control purposes during the transition period of said aircraft between rising vertically and flying horizontally.

8. In an aircraft as stated in claim 7, wherein the axes of said horizontal vane and elevator are offset from each other.

9. In an aircraft including a pair of standard exterior control vanes and a rearwardly directed engine exhaust tail pipe, the provision of a flight control system, comprising: an interior pair of control vanes pivotally mounted in the path of gases from the engine exhaust tail pipe, the axes of said interior control vanes being offset from the axes of said exterior control vanes, and means for moving said interior control vanes and said exterior control vanes at different rates of angular displacement throughout their range of movement.

References Cited in the file of this patent

UNITED STATES PATENTS

| | | |
|---|---|---|
| 1,825,609 | Wald | Sept. 29, 1931 |
| 2,850,977 | Pollack | Sept. 9, 1958 |
| 2,928,238 | Hawkins | Mar. 15, 1960 |

FOREIGN PATENTS

| | | |
|---|---|---|
| 316,816 | Italy | Apr. 16, 1934 |